United States Patent [19]

Powers et al.

[11] 4,243,732

[45] Jan. 6, 1981

[54] CHARGE TRANSFER COMPLEX CATHODES FOR SOLID ELECTROLYTE CELLS

[75] Inventors: Robert A. Powers, Lakewood; Demetrios V. Louzos, Rock River, both of Ohio

[73] Assignee: Union Carbide Corporation, New York, N.Y.

[21] Appl. No.: 52,846

[22] Filed: Jun. 28, 1979

[51] Int. Cl.$^3$ .............................................. H01M 4/36
[52] U.S. Cl. .................................... 429/105; 429/191; 429/199; 429/213
[58] Field of Search ............... 429/105, 101, 191, 199, 429/218, 213, 212; 252/182.1

[56] References Cited

U.S. PATENT DOCUMENTS

| | | | |
|---|---|---|---|
| 3,660,163 | 5/1972 | Moser | 429/191 |
| 3,660,164 | 5/1972 | Hermann et al. | 429/191 |
| 4,017,327 | 4/1977 | Lewis | 106/273 R |
| 4,026,788 | 5/1977 | McHenry | 208/39 |
| 4,049,890 | 9/1977 | Schneider | 429/213 X |

OTHER PUBLICATIONS

Aronson, Mittelman, Zygler and Bramwell, Carbon, 1978 vol. 16—pp. 69–72.

*Primary Examiner*—Anthony Skapars
*Attorney, Agent, or Firm*—Cornelius F. O'Brien

[57] ABSTRACT

Charge transfer complex cathodes for use in solid cell systems wherein the cathodes are the reaction products of a halogen such as iodine or bromine with a carbonaceous pitch such as mesophase pitch.

11 Claims, No Drawings

CHARGE TRANSFER COMPLEX CATHODES FOR SOLID ELECTROLYTE CELLS

FIELD OF THE INVENTION

The invention relates to a cathode for use, primarily, in solid state cell systems and wherein the cathode comprises a charge transfer complex in which the complex is the reaction product of at least one halogen with a carbonaceous pitch, such as mesophase pitch.

BACKGROUND OF THE INVENTION

Ionic conductivity is usually associated with the flow of ions through an aqueous solution of metallic salts. In the vast majority of practical uses of ionic conductors, e.g., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have ionic conductances approaching those exhibited by the commonly used liquid systems. Such compounds have specific conductances at room temperature (20° C.) in the range of $10^{-6}$ to $10^{-15}$ ohm$^{-1}$ cm$^{-1}$ as compared to aqueous solutions of salts which typically have a specific conductance of 0.5 to 0.05 ohm$^{-1}$ cm$^{-1}$.

Improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid electrolyte power sources.

Gutman et al, J. Electrochem. Soc., 114, 323 (1967) discloses solid state cells utilizing cathodes of electronically conducting charge transfer complexes and anodes of selected divalent metals. U.S. Pat. No. 3,660,163 discloses solid state lithium-iodine primary cells employing a lithium anode, a solid state lithium halide electrolyte and a conductive cathode of organic materials, such as polycyclic aromatic compounds, organic polymers, heterocyclic nitrogen containing compounds, and the like, and iodine. U.S. Pat. No. 3,660,164 discloses solid state cells utilizing as a cathode a charge transfer complex in which the acceptor component is the halogen and the donor component is an organic compound, typically aromatic or heterocyclic.

Although various cathode materials have been recited in the art for use in various cell systems, an object of the present invention is to provide a novel cathode for use in solid electrolyte cell systems.

Another object of the present invention is to provide a cathode comprising a charge transfer complex in which the complex is the reaction product of at least one halogen with a carbonaceous pitch.

Another object of the present invention is to provide a cathode comprising a charge transfer complex in which the complex is the reaction product of iodine or bromine with mesophase pitch.

Another object of the present invention is to provide a cathode comprising a charge transfer complex in which the complex is the reaction product of iodine with mesophase pitch for use in a solid state cell employing a lithium anode and a solid lithium iodide electrolyte.

The foregoing and additional objects will become more fully apparent from the following description.

SUMMARY OF THE INVENTION

The invention relates to a cathode for use in an electrochemical cell comprising a charge transfer complex in which the complex is the reaction product of at least one halogen with a carbonaceous pitch and wherein the donor component is the carbonaceous pitch and the acceptor component is the at least one halogen.

As used herein, at least one halogen shall mean a halogen such as iodine, bromine, chlorine or fluorine, a mixture of two or more halogens or a compound (interhalogen) of two or more halogens.

Charge transfer complexes are a well-known class of materials that have two components—one as an electron donor, the other as an electron acceptor—that form weakly bonded complexes that exhibit electronic conductivity higher than either component. Charge transfer complexes for this invention comprise a carbonaceous pitch as the electron donor and at least one halogen as the electron acceptor. The preferred charge transfer complexes of this invention would be the reaction product of a mesophase-containing pitch with iodine or bromine. Although the conductivity of the charge transfer complexes of this invention will be sufficiently high for most cell applications, the conductivity could be made higher by adding a conductive material such as carbon, graphite or an inert conductive metal. Preferably, the conductivity of the charge transfer complexes for most cell applications should be greater than about $10^6$ mho/cm.

Natural and synthetic carbonaceous pitches, as is well known, are complex mixtures of organic compounds which, except for certain rare paraffinic-base pitches derived from certain petroleums, such as Pennsylvania crude, are made up essentially of fused ring aromatic hydrocarbons and are, therefore, said to have an aromatic base. Since the molecules which make up these organic compounds are comparatively small (average molecular weight not more than a few hundred) and interact only weakly with one another, such pitches are isotropic in nature. On heating these pitches under quiescent conditions at a temperature of about 350°–450° C., however, either at constant temperature or with gradually increasing temperature, small insoluble liquid spheres begin to appear in the pitch which gradually increase in size as heating is continued. When examined by electron diffraction and polarized light techniques, these spheres are shown to consist of layers of oriented molecules aligned in the same direction. As these spheres continue to grow in size as heating is continued, they come in contact with one another and gradually coalesce with each other to produce the larger masses of aligned layers. As coalescence continues, domains of aligned molecules much larger than those of the original spheres are formed. These domains come together to form a bulk mesophase wherein the transition from one oriented domain to another sometimes occurs smoothly and continuously through gradually curving lamellae and sometimes through more sharply curving lamellae. The differences in orientation between the domains create a complex array of polarized light extinction contours in the bulk mesophase corresponding to various types of linear discontinuity in molecular alignment. The ultimate size of the oriented domains produced is dependent upon the viscosity, and the rate of increase of the viscosity, of the mesophase from which they are formed, which, in turn, are dependent upon the particular pitch and the heating rate. In certain pitches, domains having sizes in excess of two hundred microns up to several hundred microns are produced. In other pitches, the viscosity of the mesophase is such that only limited coalescence and structural rearrangement of layers occur, so that the ultimate domain size does not exceed one hundred microns.

The highly oriented, optically anisotropic, insoluble material produced by treating pitches in this manner has been given the term "mesophase", and pitches containing such material are known as "mesophase pitches". Such pitches, when heated above their softening points, are mixtures of two immiscible liquids, one the optically anisotropic, oriented mesophase portion, and the other the isotropic non-mesophase portion. The term "mesophase" is derived from the Greek "mesos" or "intermediate" and indicates the pseudocrystalline nature of this highly-oriented, optically anisotropic material. As used herein, "mesophase pitch" or "mesophase" shall mean a carbonaceous pitch containing mesophase.

A detailed description for producing mesophase pitch can be found in U.S. Pat. Nos. 4,005,183, 4,017,327 and 4,026,788, and U.S. application Ser. No. 833,963 filed on Oct. 3, 1977 in the name of Stephen Chivastick, all of which are incorporated herein by reference.

The preferable carbonaceous pitches for use in this invention are mesophase pitches and more preferable would be mesophase pitches having a mesophase content of above 40 percent by weight and preferably would be mesophase pitches having a mesophase content of above 90 percent by weight and most preferably above 95 percent by weight.

Specific preferable iodine-containing and bromine-containing charge transfer complexes for use in this invention are as follows:

X·$I_2$ where X is mesophase pitch and the amount of iodine varies between about 50% and about 97%. by weight and preferably between about 80% and about 90% by weight;

X·$Br_2$ where X is mesophase pitch and the amount of bromine varies between about 50% and about 97% by weight and preferably between about 80% and about 90% by weight.

The above solid charge transfer complexes have been found to have vapor pressures below those of iodine and bromine.

Anode materials suitable for use with the cathodes of this invention include lithium, silver, sodium, potassium, rubidium, magnesium and calcium. The preferred anode material is lithium.

Solid electrolytes for use in this invention would include lithium iodide, silver iodide, silver bromide, lithium bromide, tetrasilver rubidium pentaiodide, lithium aluminum tetrachloride, tetrasilver potassium tetraiodide cyanide, tetrasilver rubidium tetraiodide cyanide, sodium iodide and sodium bromide. The preferred solid electrolytes for use in this invention are lithium iodide and tetrasilver potassium tetraiodide cyanide.

As disclosed in U.S. Pat. No. 3,660,163, in a lithium anode cell, lithium iodide can be formed in situ by contacting the lithium anode with the iodine-containing cathode surface whereupon the lithium will react with the iodine in the cathode to form a lithium iodide electrolyte layer that will contact both the anode and the cathode. Alternately, the lithium iodide could be formed by reacting lithium and iodine and then applying the lithium iodide as a coating on the surface of the anode or cathode.

Preferable cell systems using the cathode of this invention would be as follows:

| Anode | Electrolyte |
| --- | --- |
| lithium | lithium iodide |
| lithium | lithium bromide |
| silver | silver iodide |
| silver | tetrasilver potassium tetraiodide cyanide |
| silver | tetrasilver rubidium tetraiodide cyanide |

EXAMPLE 1

Several charge transfer complexes were prepared by blending mesophase pitch (containing about 85 percent mesophase) with iodine in the weight ratios shown in Table I. The blends were then sealed in an evacuated glass tube where they were then either aged at room temperature (20° C.) or heated to the temperature shown in Table I for 16 hours. The mesophase/iodine charge transfer complexes so formed and iodine ($I_2$) were then tested for iodine vapor pressure and the data obtained are shown in Table I.

TABLE I

| Charge Transfer Complexes or Iodine | Reaction Synthesis Temp. °C. | Iodine Vapor Pressure (mm Hg) | | |
| --- | --- | --- | --- | --- |
| | | 20° C. | 54° C. | 71° C. |
| *Mesophase . 94% Iodine by weight | 200° | 0.1 | 1.6 | 6.6 |
| Mesophase . 95% Iodine by weight | 200° | 0.1 | 1.7 | 6.8 |
| Mesophase . 95% Iodine by weight | 200° | 0.2 | 2.6 | 7.0 |
| Mesophase . 97% Iodine by weight | 20° | 0.2 | 2.4 | 8.1 |
| Mesophase . 97% Iodine by weight | 120° | 0.3 | 3.0 | 8.7 |
| Mesophase . 97% Iodine by weight | 200° | 0.2 | 2.9 | 8.4 |
| Mesophase . 95% Iodine by weight | 20° | 0.2 | 2.3 | 7.7 |
| Mesophase . 95% Iodine by weight | 120° | 0.2 | 2.9 | 8.1 |
| Mesophase . 95% Iodine by weight | 200° | 0.2 | 2.5 | 8.7 |
| Iodine | — | 0.3 | 4.9 | 9.0 |

*Mesophase pitch containing about 85% mesophase

As evident from the data shown in Table I, the mesophase/iodine-containing charge transfer complexes have iodine vapor pressures depressed below that of iodine, particularly at elevated test temperatures.

EXAMPLE 2

A charge transfer complex consisting of mesophase pitch containing about 85% mesophase and bromine was formed as in Example 1 in which a chemical analysis revealed that bromine was present in a 52 weight percent proportion. The mesophase/bromine charge transfer complex so formed and bromine were tested for bromine vapor pressure at various temperatures and the data observed are shown in Table II.

TABLE II

| Material | Bromine Vapor Pressure (mm Hg) | | |
|---|---|---|---|
| | 20° C. | 54° C. | 71° C. |
| Mesophase . Bromine | 5.2 | 9.7 | 33 |
| Bromine | 220 | 640 | 1200 |

As evident from the data shown in Table II, the mesophase/bromine-containing charge transfer complex had a bromine vapor pressure substantially below that of bromine.

EXAMPLE 3

Samples of the mesophase/iodine-containing charge transfer complexes were prepared as in Example 1 at 200° C. using the weight ratio as shown in Table III. The conductances of these samples along with mesophase pitch and iodine ($I_2$) were found and the data observed are shown in Table III.

TABLE III

| Material | Conductance (ohm$^{-1}$ cm$^{-1}$) |
|---|---|
| mesophase | under $10^{-8}$ |
| iodine | $1.7 \times 10^{-7}$ |
| mesophase . 67% iodine* | $6.0 \times 10^{-4}$ |
| mesophase . 94% iodine* | $2.2 \times 10^{-5}$ |

*by weight

EXAMPLE 4

Two 0.457-inch diameter button cells were constructed as follows. A mesophase (about 85% mesophase)/iodine charge transfer complex was prepared by grinding the mesophase pitch and iodine components followed by drying them using phosphorus pentoxide for a week in an argon dry box. Thereafter the mesophase pitch and iodine were blended together in a weight ratio of one mesophase pitch to 18 iodine (mesophase 95% iodine) and then sealed in an evacuated tube whereupon it was heated at 200° C. for 16 hours. The resulting charge transfer complex was assembled in a nickel-plated cold-rolled steel container. A lithium anode strip was placed in a cover which was then assembled along with a gasket on top of the container in a conventional manner such that the surface of the anode made contact with the surface of the cathode. The electrolyte, lithium iodide, was formed in situ by the reaction of the lithium in the anode and the iodine in the cathode. The two cells were then discharged for 10-second periods across various resistive loads and the voltages observed were recorded. Based on the total surface area of the cathode facing the anode, the current density was calculated for each voltage reading and the data obtained are shown in Table IV.

TABLE IV

| Cell 1 | | Cell 2 | |
|---|---|---|---|
| Voltage (volts) | Current density $\mu A/cm^2$ | Voltage (volts) | Current density $\mu A/cm^2$ |
| 2.75 | 2.6 | 2.7 | 2.7 |
| 2.6 | 5.6 | 2.55 | 5.8 |
| 2.5 | 8.4 | 2.45 | 8 |
| 2.35 | 11 | 2.3 | 11 |
| 2.25 | 15 | 2.2 | 14 |
| 2.1 | 20 | 1.95 | 18.5 |
| 1.6 | 30 | 1.5 | 30 |
| 0.8 | 50 | 0.65 | 61 |

EXAMPLE 5

A 0.457 inch diameter button cell was constructed as in Example 4 except that the can was stainless steel and the mesophase pitch and iodine of the charge transfer complex were in a weight ratio of one mesophase pitch to 16 iodine (mesophase·94% iodine). The cell was continuously discharged across a 1-megohm load and the data obtained are shown in Table V.

TABLE V

| Time (hours) | Voltage (volts) |
|---|---|
| 100 | 2.75 |
| 250 | 2.65 |
| 300 | 2.60 |
| 600 | 2.50 |
| 700 | 2.45 |
| 800 | 2.40 |
| 900 | 2.35 |
| 1100 | 2.30 |

EXAMPLE 6

Two 0.457 inch diameter button cells were constructed as follows. A mesophase (85% mesophase)/bromine charge transfer complex was prepared by grinding the mesophase pitch and drying it using phosphorus pentoxide for a week in an argon dry box. Thereafter the mesophase pitch and bromine were mixed together in a weight ratio of one mesophase pitch to 1 bromine. The resulting charge transfer complex was assembled in a nickel plated cold rolled steel can. A lithium anode strip was placed in a cover which was then assembled along with a gasket on top of the can in a conventional manner such that the surface of the anode made contact with the surface of the cathode. The electrolyte, lithium bromide, was formed in situ by the reaction of the lithium in the anode and the bromine in the cathode. The cell was then discharged for 10-second periods across various resistive loads and the voltages observed were recorded. Based on the total surface area of the cathode facing the anode, the current density was calculated for each voltage reading and the data obtained are shown in Table VI.

TABLE VI

| Voltage (volts) | Current Density $\mu A/cm^2$ |
|---|---|
| 3.3 | 3.4 |
| 3.1 | 7.0 |
| 2.9 | 10 |
| 2.7 | 14 |
| 1.6 | 32 |
| 0.5 | 52 |

EXAMPLE 7

Two cells were constructed as in Example 4 except that the charge transfer complex employed was a blend of 67% by weight iodine with 33% mesophase pitch (about 85% mesophase). Each cell was tested as described in Example 4, and the data obtained are shown in Table VII.

TABLE VII

| Cell 1 | | Cell 2 | |
| --- | --- | --- | --- |
| Voltage (volts) | Current density ($\mu$A/cm$^2$) | Voltage (volts) | Current density ($\mu$A/cm$^2$) |
| 2.72 | 2.7 | 2.69 | 2.7 |
| 2.71 | 6 | 2.68 | 6 |
| 2.71 | 9 | 2.67 | 9 |
| 2.70 | 13 | 2.66 | 13 |
| 2.69 | 18 | 2.65 | 18 |
| 2.68 | 27 | 2.63 | 26 |
| 2.63 | 52 | 2.55 | 51 |
| 2.31 | 231 | 2.10 | 210 |

The two cells were then tested as described in Example 5. The data obtained are shown in Table VIII.

TABLE VIII

| Cell 1 | | Cell 2 | |
| --- | --- | --- | --- |
| Time (Hours) | Voltage (volts) | Time (hours) | Voltage (volts) |
| 10 | 2.77 | 10 | 2.77 |
| 100 | 2.77 | 100 | 2.76 |
| 200 | 2.76 | 200 | 2.75 |
| 300 | 2.75 | 300 | 2.75 |
| 500 | 2.73 | 500 | 2.72 |
| 1000 | 2.67 | 1000 | 2.67 |
| 2000 | 2.50 | 2000 | 2.50 |

EXAMPLE 8

Two cells were constructed as in Example 4 except that the charge transfer complex employed was a blend of 86% by weight iodine with 14% mesophase pitch (about 85% mesophase). Each cell was tested as described in Example 4, and the data obtained are shown in Table IX.

TABLE IX

| Cell 1 | | Cell 2 | |
| --- | --- | --- | --- |
| Voltage (volts) | Current density ($\mu$A/cm$^2$) | Voltage (volts) | Current density ($\mu$A/cm$^2$) |
| 2.76 | 2.76 | 2.75 | 2.75 |
| 2.75 | 6 | 2.73 | 6 |
| 2.75 | 9 | 2.71 | 9 |
| 2.74 | 13.7 | 2.68 | 13 |
| 2.74 | 18 | 2.65 | 18 |
| 2.72 | 27 | 2.58 | 26 |
| 2.69 | 54 | 2.41 | 48 |
| 2.43 | 243 | 1.57 | 157 |

The two cells were then tested as described in Example 5. The data obtained are shown in Table X.

TABLE X

| Cell 1 | | Cell 2 | |
| --- | --- | --- | --- |
| Time (hours) | Voltage (volts) | Time (hours) | Voltage (volts) |
| 10 | 2.77 | 10 | 2.75 |
| 100 | 2.77 | 100 | 2.73 |
| 200 | 2.77 | 200 | 2.71 |
| 300 | 2.76 | 300 | 2.71 |
| 500 | 2.75 | 500 | 2.69 |
| 1000 | 2.72 | 1000 | 2.66 |
| 1800 | 2.68 | 1800 | 2.63 |

EXAMPLE 9

A cell was constructed as in Example 4 except that the charge transfer complex employed was a blend of 75% by weight iodine with 25% mesophase pitch (about 85% mesophase). The cell was tested as described in Example 4 and the data obtained are shown in Table XI.

TABLE XI

| Voltage (volts) | Current density ($\mu$A/cm$^2$) |
| --- | --- |
| 2.65 | 2.7 |
| 2.65 | 6 |
| 2.64 | 9 |
| 2.64 | 13 |
| 2.64 | 18 |
| 2.63 | 26 |
| 2.60 | 52 |
| 2.38 | 238 |

The cell was then tested as described in Example 5. The data obtained are shown in Table XII.

TABLE XII

| Time (hours) | Voltage (volts) |
| --- | --- |
| 10 | 2.77 |
| 100 | 2.76 |
| 200 | 2.75 |
| 500 | 2.72 |
| 800 | 2.71 |

It should be understood that the foregoing disclosure relates to preferred embodiments of the invention and it is intended to cover all changes and modifications of the invention which do not depart from the spirit and scope of the appended claims.

What is claimed is:

1. A cathode for use in an electrochemical cell comprising a charge transfer complex in which the complex is the reaction product of at least one halogen with mesophase pitch and wherein the donor component is the mesophase pitch and the acceptor component is the at least one halogen.

2. The cathode of claim 1 wherein the at least one halogen is selected from the group consisting of iodine, bromine, chlorine and fluorine.

3. The cathode of claim 1 wherein the at least one halogen is iodine.

4. The cathode of claim 1 wherein the at least one halogen is bromine.

5. The cathode of claim 1 wherein the charge transfer complex is X·YI$_2$ where X is mesophase pitch and wherein the amount of iodine varies between about 50% and about 97% by weight.

6. The cathode of claim 5 wherein the iodine varies between about 80% and about 87% by weight.

7. The cathode of claim 1 wherein the charge transfer complex is X·Br$_2$ where X is mesophase pitch and wherein the amount of bromine varies between about 50% and about 97% by weight.

8. The cathode of claim 1 for use in a solid electrolyte cell employing an anode selected from the group consisting of lithium, silver, sodium, potassium, rubidium, magnesium and calcium.

9. The cathode of claim 1 or 8 for use in a solid electrolyte cell employing an electrolyte selected from the group consisting of lithium iodide, tetrasilver potassium tetraiodide cyanide, lithium bromide and tetrasilver rubidium pentaiodide.

10. The cathode of claim 2 for use in a solid electrolyte cell wherein the halogen is iodine, the anode is lithium and the electrolyte is lithium iodide.

11. The cathode of claim 2 for use in a solid electrolyte cell wherein the halogen is bromine, the anode is lithium and the electrolyte is lithium bromide.

* * * * *

UNITED STATES PATENT AND TRADEMARK OFFICE
CERTIFICATE OF CORRECTION

PATENT NO. : 4,243,732
DATED : January 6, 1981
INVENTOR(S) : R. A. Powers et al

It is certified that error appears in the above—identified patent and that said Letters Patent is hereby corrected as shown below:

Column 8, line 64 (claim 6), after the word "about", second occurrence, delete "87" and substitute therefor -- 97 --.

Signed and Sealed this

Twenty-third Day of June 1981

[SEAL]

Attest:

RENE D. TEGTMEYER

Attesting Officer

Acting Commissioner of Patents and Trademarks